No. 809,053. PATENTED JAN. 2, 1906.
A. GORDON.
MANUFACTURE OF SAND LIME BRICKS.
APPLICATION FILED MAY 4, 1905.

WITNESSES:
H. Walker
A. E. Fay

INVENTOR
Alexander Gordon
BY
ATTORNEYS

UNITED STATES PATENT OFFICE.

ALEXANDER GORDON, OF WEISER, IDAHO.

MANUFACTURE OF SAND-LIME BRICKS.

No. 809,053.  Specification of Letters Patent.  Patented Jan. 2, 1906.

Application filed May 4, 1905. Serial No. 258,808.

*To all whom it may concern:*

Be it known that I, ALEXANDER GORDON, a citizen of the United States, and a resident of Weiser, in the county of Washington and State of Idaho, have invented certain new and useful Improvements in the Manufacture of Sand-Lime Bricks, of which the following is a full, clear, and exact description.

My invention relates to the manufacture of bricks, and is especially applicable to the hardening of sand-lime bricks. In the present state of the art bricks of this character are placed in a cylinder or other receptacle and hardened under the influence of steam under pressure admitted to the interior of the receptacle. This affords the proper temperature and also the moisture necessary to facilitate the chemical action which takes place upon the hardening of bricks of this character. The moisture, however, is so great that if the bricks were molded in what is called a "wet" state they would be too moist while in the hardening apparatus, and consequently would be subject to damage due to their extreme plasticity. Consequently what is called a "dry" molding process has been necessary in making this class of bricks. This is objectionable on account of the fact that by the dry process the material cannot be made as plastic as it can with the wet process and that consequently the molding operation does not form bricks of such hardness as is desired.

It is the principal object of my invention to overcome these difficulties by providing a hardening method that will permit the molding of bricks in a moister state, so as to take full advantage of the plasticity inherent in the materials employed, and, furthermore, to use the pallet system of molding and hardening.

Reference is to be had to the accompanying drawings, forming a part of this specification, in which similar characters of reference indicate corresponding parts in both the figures.

Figure 1:
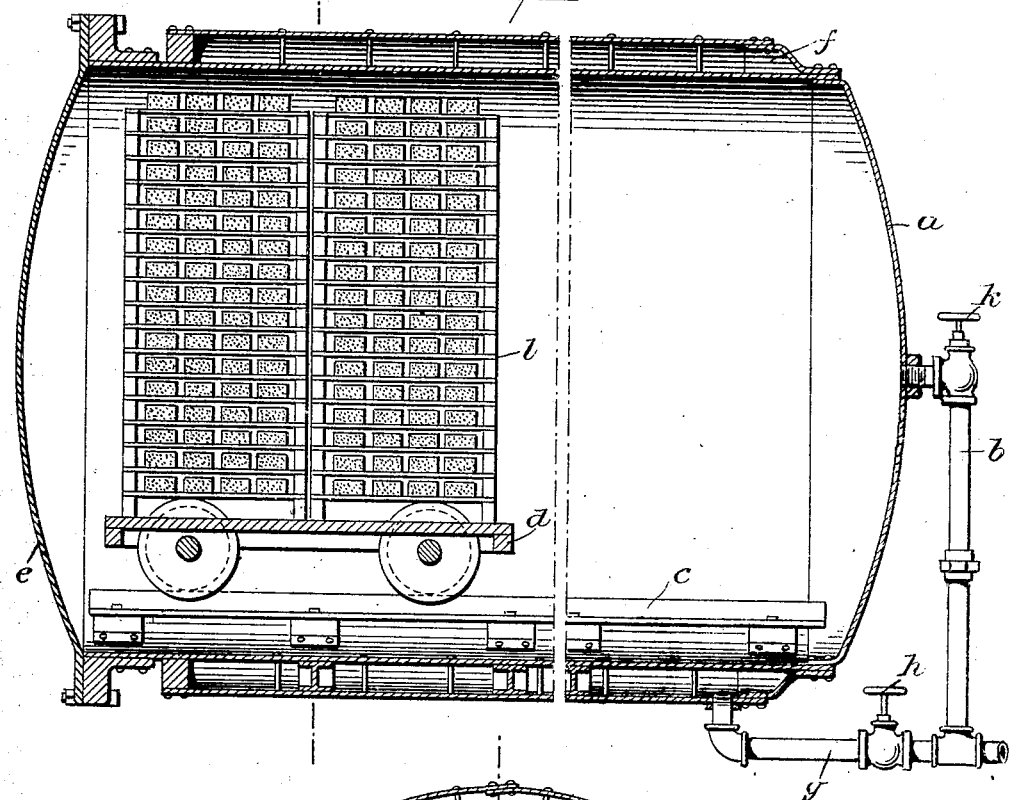
Figure 2:
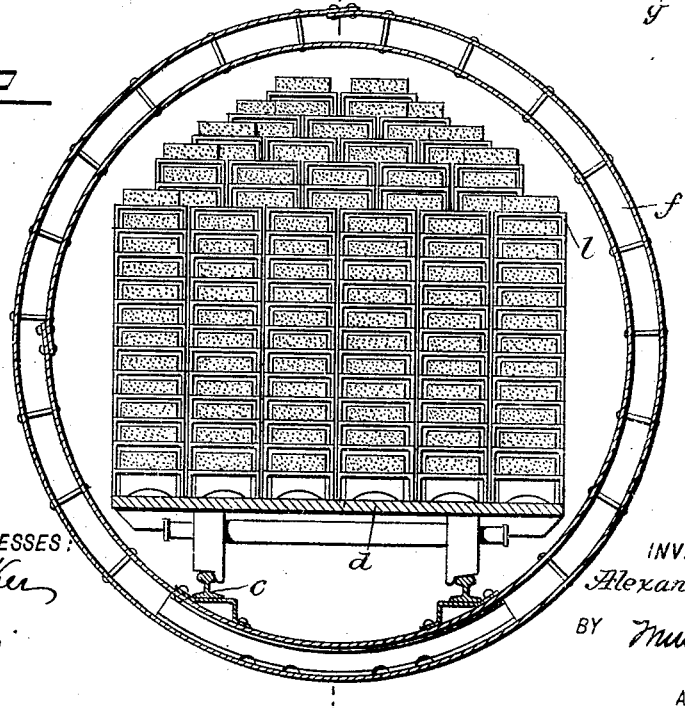

Figure 1 is a central longitudinal sectional view of an apparatus in which my invention can be carried out, and Fig. 2 is a transverse sectional view of the same.

The apparatus which is now used comprises a receptacle $a$, preferably cylindrical in form and provided with a pipe $b$ for the introduction of steam. This receptacle has a track $c$, upon which trucks $d$ carrying bricks to be hardened can be introduced into the receptacle. A cover $e$ is provided for closing the receptacle before the steam is turned on. My invention involves certain changes in the construction of this apparatus, especially the addition of a steam-jacket $f$ and a pipe $g$, through which steam can be introduced into the jacket. Two valves $h$ and $k$ are also provided for controlling the passage of steam in a manner to be referred to later.

The preferred manner of carrying out my improved process will now be described. The bricks are molded of the usual materials, but in a moist or wet state. This, as has been stated, provides for tamping or pressing the plastic material more firmly, and so producing a harder and much more durable product. They are also preferably placed upon pallets (represented by the letter $l$ in the drawings) in a way which is well understood and piled upon the trucks with the pallets. They are then introduced in the usual manner into the receptacle $a$; but instead of turning the steam into the interior of this receptacle it is first turned into the jacket $f$ through the pipe $g$. This affords a dry heat in the interior of the receptacle, so as to give a preliminary drying action to the bricks and reduce the amount of moisture contained therein. After this operation has been carried on for a time sufficient to bring the bricks into such condition that the steam can be turned onto them directly the valve $k$ is opened and steam under full pressure admitted into the interior of the receptacle. The hardening from this point is done in the usual manner. While the steam is being admitted into the interior of the receptacle it can be admitted to the jacket or not, as desired.

It will be seen that by this process the direct steam is excluded from the bricks in the cylinder during the first stage, thus allowing brick of very moist nature to be placed in the hardening-receptacle. This is something that has not heretofore been accomplished, as brick has to be relatively dry in order to stand the direct pressure of the steam. I also exclude the external air from the brick while in the first stage of hardening by closing the door $e$ at the time the steam is admitted to the jacket. The preliminary drying is preferably carried on for a period of from five to eight hours, with the steam-pressure at about one hundred and twenty pounds.

A great advantage of my invention consists in the fact that while heretofore sand-lime brick had to be formed upon heavy presses, which were constructed in such a manner as to withstand a great deal of pressure, they can by my method be made on ordinary presses, such as are used for the ordinary clay brick, and can be delivered directly from the press on pallets to the trucks. They are thus not handled until after they have gone through the hardening process and the calcium silicate has been formed. The sharp corners produced in molding are thus preserved, and the strength of the bricks is much improved.

Having thus described my invention, I claim as new and desire to secure by Letters Patent—

1. A process of making sand-lime bricks, which comprises molding by the wet process, subjecting the bricks thus produced to a dry heat in a closed receptacle, and then subjecting them to a moist heat.

2. The process of making sand-lime brick, which comprises molding by the wet process, subjecting the bricks to a dry heat produced by steam, and then subjecting them to the direct action of steam.

3. A process of manufacturing sand-lime bricks, which consists in molding them in a moist state, transferring them from a molding-machine to pallets, introducing the bricks on the pallets into a heated dry atmosphere excluding external air from the bricks, and finally subjecting the bricks to a moist heat.

4. A process of making sand-lime bricks which comprises molding by the wet process, subjecting the bricks thus produced to a dry heat produced by steam, the bricks being in a closed receptacle, to preliminarily harden them and then completing the hardening operation by subjecting the bricks to the direct action of a heating medium composed of steam.

5. A process of making sand-lime bricks which comprises molding in a moist state, subjecting the bricks to a dry heat at ordinary pressures in a closed receptacle thereby evaporating water held in the bricks after molding, preliminarily hardening the bricks in their own steam thus generated and continuing the hardening operation by subjecting the bricks to a moist heat.

6. An apparatus for hardening sand-lime bricks, comprising a receptacle having a steam-jacket and provided with a track upon the inside thereof, a pipe for introducing steam into the jacket, a pipe for introducing steam in the interior of the receptacle, valves for both of said pipes, and means for connecting said pipes with the main supply-pipe, whereby the steam may be introduced into the jacket or receptacle at will.

7. An apparatus for hardening sand-lime bricks, comprising a receptacle having a steam-jacket and provided with a track upon the inside thereof, a pipe for introducing steam into the jacket, a pipe for introducing steam in the interior of the receptacle, valves for both of said pipes, and means for connecting said pipes with the main supply-pipe, in combination with a truck for running on said track, said truck being provided with pallets for supporting sand-lime bricks in a soft state.

In testimony whereof I have signed my name to this specification in the presence of two subscribing witnesses.

ALEXANDER GORDON.

Witnesses:
FRANK HARRIS,
S. F. SMITH.